United States Patent [19]

Champagne et al.

[11] Patent Number: 4,779,159
[45] Date of Patent: Oct. 18, 1988

[54] SHUTTER LATCH MECHANISM FOR A DISK CARTRIDGE

[75] Inventors: Patrick J. Champagne, Cupertino, Calif.; James R. Carey; David L. Rowden, both of Rochester, N.Y.

[73] Assignee: Verbatim Corporation, Sunnyvale, Calif.

[21] Appl. No.: 59,996

[22] Filed: Jun. 9, 1987

[51] Int. Cl.[4] ............................................. G11B 23/03
[52] U.S. Cl. .................................................. 360/133
[58] Field of Search ........................ 360/133; 206/444

[56]  References Cited

U.S. PATENT DOCUMENTS

| | | | |
|---|---|---|---|
| 4,614,270 | 9/1986 | Oishi | 360/133 |
| 4,614,990 | 9/1986 | Saito | 360/133 |
| 4,688,206 | 8/1987 | Nakagawa et al. | 360/133 |

Primary Examiner—Robert S. Tupper
Attorney, Agent, or Firm—Dennis P. Monteith

[57] ABSTRACT

A disk cartridge comprises top and bottom plates having integral peripheral lips joined together to form a peripheral wall when the top and bottom plates are secured together. The peripheral wall serves to space the lower surface of the top plate from the upper surface of the bottom plate to define a compartment in which an information recording medium, such as a disk is contained for rotatable movement. At least one of the top and bottom plates is provided with an elongate head-access opening through which a transducer head gains operational access to the record tracks of the disk when the cartridge is operatively loaded into a disk drive mechanism. To protect the disk from adverse external effects such as dirt, lint, fingerprints, and the like, the cartridge is provided with a spring-biased generally U-shaped shutter for automatically covering each head-access opening when the cartridge is removed from a disk drive mechanism. The cartridge is provided with a shutter latch mechanism in the form of a resilient spring arm mounted within the cartridge compartment and having a free end portion adapted to engage the inwardly facing shoulder of a recessed portion of the shutter to latch it in its closed position.

3 Claims, 4 Drawing Sheets

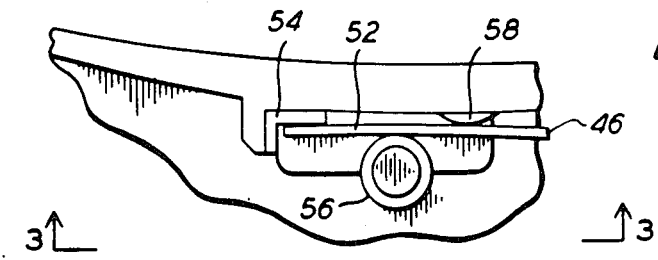
FIG. 2
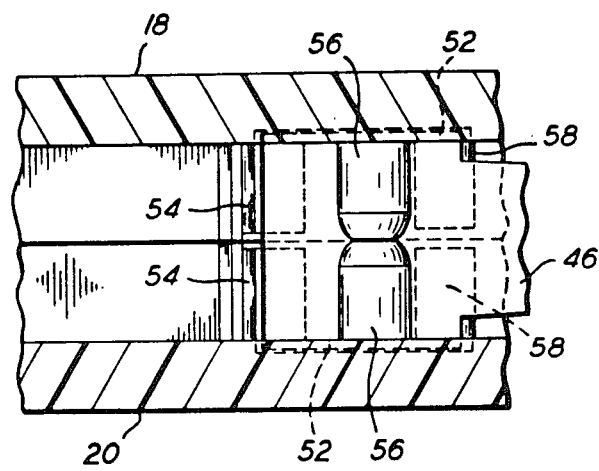
FIG. 3
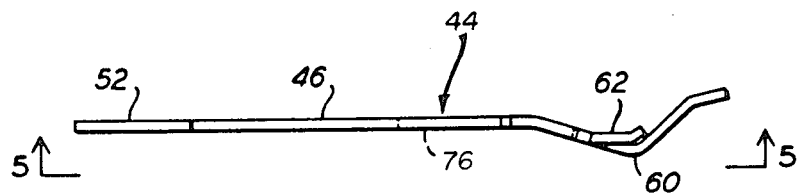
FIG. 4
FIG. 5
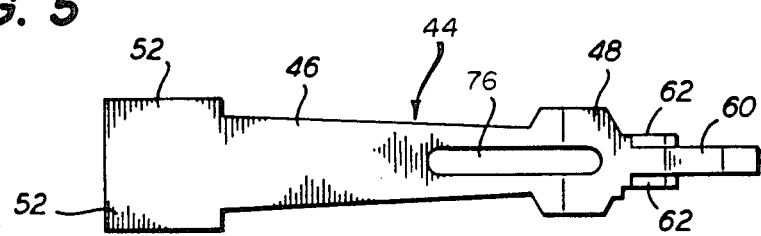

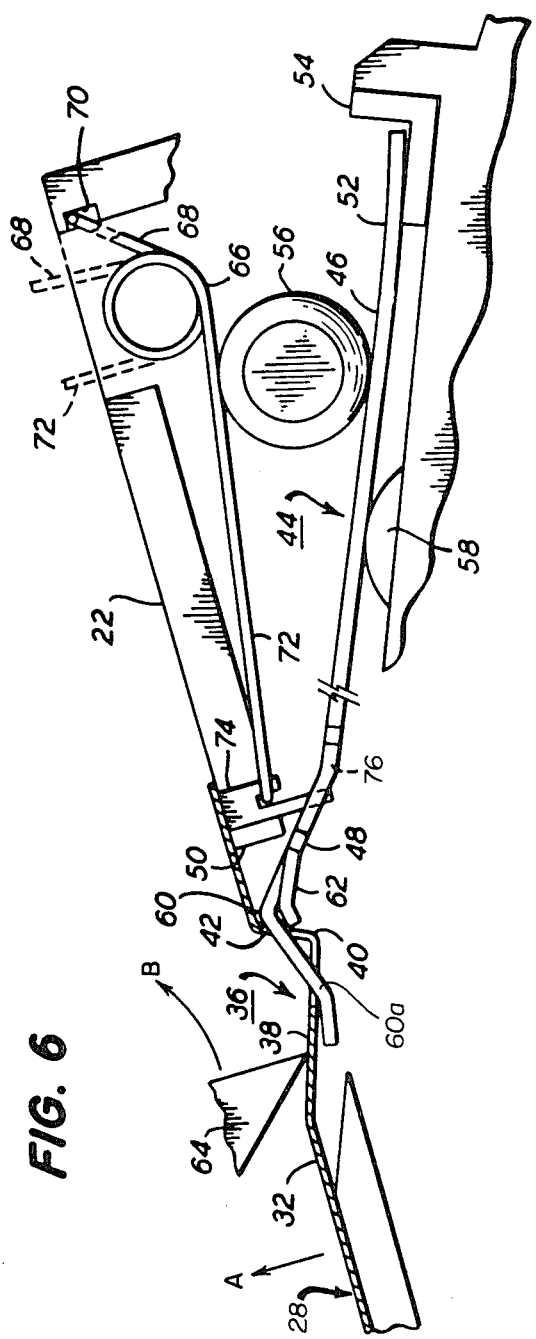
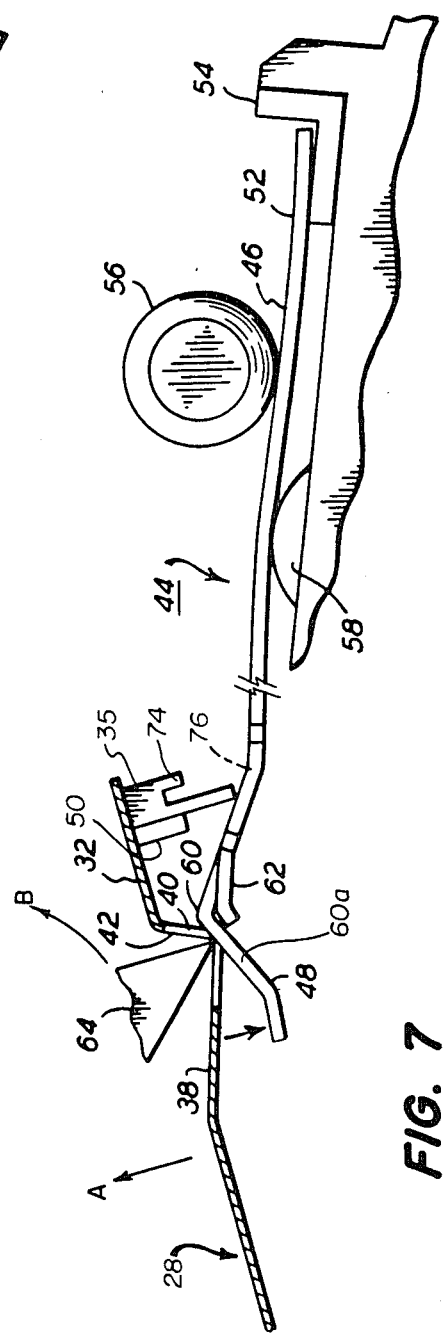

4,779,159

SHUTTER LATCH MECHANISM FOR A DISK CARTRIDGE

CROSS-REFERENCE TO RELATED APPLICATION

Reference is made to U.S. patent application Ser. No. 059,999, entitled A DISK CARTRIDGE by P. R. Ashe, J. R. Carey, P. J. Champagne and D. L. Rowden, filed on June 9, 1987.

1. Field of the Invention

The present invention relates generally to cartridges, and more specifically to a shutter latch mechanism for a cartridge containing an information recording medium, such as a disk.

2. Description of the Prior Art

U.S. Pat. No. 4,614,990, which issued to Saito on Sept. 30, 1986 discloses a disk cartridge having a shutter and a releasable latch member therefor. The latch member in the cartridge is yieldably urged outwardly into engagement with a keeper on the shutter for latching the shutter in its closed position. The shutter is positively moved to its open position by an abutment member in a cartridge disk recording device in response to the insertion of the cartridge to an operative position in the disk recording device. The shutter is positively returned to its closed position by a complicated mechanism in the disk recording device in response to the removal of the catridge from the cartridge holder. U.S. Pat. No. 4,614,990 further states that it is well known in the prior art to provide a spring in the cartridge for returing the shutter to its closed position.

U.S. Pat. No. 4,614,270, which issued to Oishi on Sept. 30, 1986, discloses a magnetic tape cassette having two slideable U-shaped shutter panels for closing a central opening in the cassette. The mechanism for moving the shutter panels to their open positions comprises a pair of scissor-like arms having end portions thereof engageable in complementary recesses in the panels. Springs coupled to the shutter panels are provided for biasing the shutter panels to their closed positions.

Although cartridges are known in the art wherein each has a shutter which is positively moveable by a spring or other means to a closed position in which it is latched, a need exists in the cartridge industry for new and improved shutter latch mechanisms that are of simple design and construction, thoroughly reliable in operation and economical to manufacture.

SUMMARY OF THE INVENTION

In a preferred embodiment of the present invention, a shutter latch mechanism for a cartridge containing an information recording medium is disclosed comprising:

two opposed spaced-apart top and bottom plates defining a compartment in which the information recording medium is rotatable, and a front peripheral wall joining the top and bottom plates with a gap in the peripheral wall communicating with the compartment, and at least one of the top and bottom plates having a window therethrough through which the information recording medium may be exposed;

a U-shaped shutter moveable on the cartridge between open and closed positions relative to the window and having spaced panels and a bridge portion therebetween to straddle the cartridge and move along the peripheral wall, the bridge portion having a recessed portion at which the shutter is engageable for movement to its open position, the recessed portion further defining a shoulder facing the gap; and a latch mounted in the compartment and having a projection extending through the gap into engagement with the shoulder for releasably latching the shutter in its closed position.

In a more specific aspect of the invention, the latch comprises an elongated flat spring arm having one end secured to one of the top and bottom plates. The opposite free end portion of the spring arm has an inverted V-shaped projection and a finger on each side of the V-shaped projection extending across and in the same direction as the V-shaped projection. The fingers engage complementary shoulders on the recessed portion of the shutter when the V-shaped projection nests in an aperture extending through the recessed portion.

An advantage of this invention is an improved resiliently biased shutter latch mechanism for a cartridge housing an information recording medium that is of simple design and construction, thoroughly reliable in operation, and economical to manufacture.

A further advantage of the invention is that a cartridge with the improved shutter latch mechanism may be used interchangeably in a common drive mechanism with a cartridge having a similar shutter but which does not have a latch mechanism as a cartridge feature.

The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 2 is an enlarged segmental top plan view of the portion of the latch mount located in the bottom plate;

FIG. 3 is an enlarged segmental section view taken substantially from line 3—3 of FIG. 2 showing the latch mounts in the top and bottom plates;

FIG. 4 is a top plan view of the flat elongate spring arm;

FIG. 5 is a side elevational view of the spring arm of FIG. 4 taken substantially from line 5—5 of FIG. 4;

FIG. 6 is an enlarged schematic top plan view partially in section of a portion of the shutter and spring latch arm showing the shutter in the latched position and the latch mount greatly enlarged;

FIG. 7 is an enlarged schematic view partially in section similar to FIG. 6 showing a portion of the shutter in an unlatched position.

DETAILED DESCRIPTION OF THE INVENTION

Figure 1:
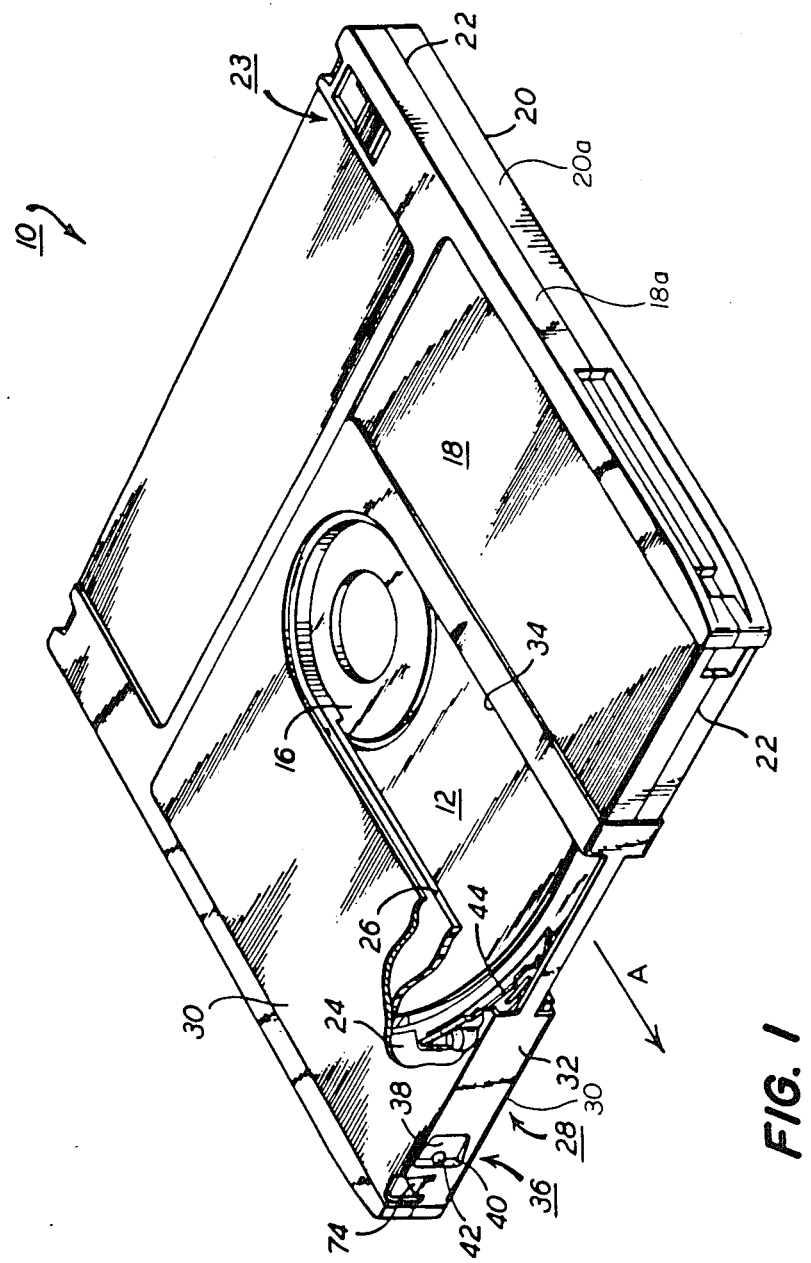
FIG. 1 is a top perspective view of a disk cartridge with a portion thereof broken away showing a preferred embodiment of the shutter latch mechanism of this invention.

FIG. 1 illustrates a presently preferred embodiment of a cartridge 10 in accordance with the invention containing an information recording medium, such as a disk 12 adapted for recording data on, and playing back data from a plurality of concentric record tracks encircling a central spindle-drive region 16 of the disk. The cartridge 10 comprises a top plate 18 and a bottom plate 20, as viewed in FIG. 1, composed of a material to provide structural rigidity. Preferably, both plates 18, 20 are plastic and are formed by a commercially available injection molding operation.

The top plate 18 and the bottom plate 20 are generally of a size to accommodate a disk of standard size, such as 3½ inch, 4¾ inch (compact disk), 5¼ inch, 8 inch or the like, to permit rotatable movement of disk 12 therebetween about a central axis of rotation. To that end, each plate 18, 20 han an integral peripheral lip 18a, 20a respectively, cooperatively forming a surrounding peripheral wall 22 which serves to space the lower surface of top plate 18 from the upper surface of bottom plate 20. Thus, peripheral wall 22 together with top plate 18 and bottom plate 20 define the outer dimensions of a generally enclosed compartment or enclosure 24 in which disk 12 is contained for rotatable movement. A write protect device, indicated generally by reference numeral 23, is located near a corner of cartridge 10 where it does not interfere with disk 12.

A presently preferred embodiment of cartridge 10 provides at least one elongate head-access opening 26 which provides, to a transducer head, operational access to the record tracks of disk 12 when cartridge 10 is operatively loaded in a disk drive mechanism.

When cartridge 10 is removed from a drive mechanism, a spring-biased generally U-shaped shutter 28 straddles the cartridge and serves for automatically covering each head-access opening 26, to protect disk 12 from adverse external effects such as dirt, lint, fingerprints, and the like. The shutter 28 comprises a pair of spaced, parallel panels 30, only the top one of which is clearly shown in FIG. 1, joined by a bridge member 32. The panels 30 are provided with registering openings 34, and bridge member 32 has an inwardly projecting recessed portion 36 having a leading inclined surface 38 terminating in a shoulder 40, as best seen in FIGS. 1, 6 and 7. An aperture 42 extends through bridge member 32 at the junction or root of inclined surface 38 and shoulder 40.

The shutter 28 is mounted for slideable movement along a portion of front peripheral wall 22 between a first extreme position, as shown by the solid lines of FIG. 1, in which each head-access opening 26 is uncovered by shutter openings 34, and a second extreme position in which each head-access opening 26 is covered by shutter panels 30. The slideable movement is achieved by providing at least one panel 30 of shutter 28 with struck-out lugs, not shown, slideable within an elongate groove, not shown, in the complementary cartridge plate, which groove is parallel to front peripheral wall 22. An inwardly projecting lug 35 (FIGS. 6 and 7) of bridge member 32, extending through a grooved track 22a (FIG. 8), serves, by means made apparent hereinbelow, to enable movement of the shutter 28 along the front peripheral wall 22 from its head-access opening position (FIG. 1) to its head-access covering position.

With reference to FIGS. 2–8, the shutter latch mechanism comprises a flat spring arm 44 having one end portion 46 secured to the top and bottom plates 18, 20, and its opposite free end portion 48 extending through a gap 50 (FIGS. 6, 7 and 8) in peripheral wall 22. End portion 46 has laterally extending flap portions 52 nesting in registering notches in the top and bottom plates 18, 20. End portion 46 is further clamped between abutments shown as L-shaped stops 54, pins 56 and arcuate ribs 58 on the top and bottom plates 18, 20. FIGS. 4 and 5 show that free end portion 48 has an inverted V-shaped projection 60 and a pair of wing like fingers 62 disposed on each side thereof extending outwardly across the V-shaped projection 60. The V-shaped projection 60 is biased by spring arm 44 so that the apex and a leg 60a of the V are in an exposed position immediately adjacent the aperture 42 of the bridge member 32 when the shutter is in its head-access covering position. In that position, the wing-like fingers 62 are biased into engagement with inner surfaces of shoulder 40 for latching shutter 28 in its latched position, as seen in FIG. 6.

A spring-loaded pivotally mounted shutter actuator 64 of a disk drive mechanism, only a portion of which is shown in FIGS. 6 and 7 serves a dual function of (1) unlatching shutter 28, and (2) moving shutter 28 from its closed position to its open position, as cartridge 10 is inserted in the direction of arrow A (FIG. 1) into the drive mechanism. (The shutter actuator 64 forms no part of the invention and thus is shown only diagrammatically.) To those ends, shutter actuator 64 engages the outer inclined surface 38 of recessed portion 36 (FIG. 6) when the cartridge 10 is initially inserted into a loading slot of the drive mechanism; the actuator 64, in response to cartridge-insertion movement (arrow A of FIG. 1), pivots in a counterclockwise direction (the arrow B of FIGS. 6 and 7) and thereby slides along the inclined surface 38 of recessed portion 36 until it abuts shoulder 40 (FIG. 7). In this position, it unlatches the shutter by engaging the exposed leg 60a of V-shaped projection 60 through the aperture 42 and flexing spring arm 44 inwardly, thereby withdrawing fingers 62 from shoulder 40 of shutter 28. The actuator 64 then continues to pivot while retreating into the drive mechanism in response to further cartridge-insertion movement in the direction of arrow A (FIG. 1) toward its final seated position in the drive mechanism. This pivoting movement of actuator 64 in the direction of arrow B urges shutter 28 via shoulder 40 into its open position, seen in FIG. 1.

A return spring 66, as best seen in FIG. 6, serves for moving or returning shutter 28 automatically to its closed head-access covering position when cartridge 10 is withdrawn from the drive mechanism. For that purpose, the spring 66 has one laterally extending end portion 68 nesting in a slot 70 in peripheral wall 22 and its opposite laterally extending end portion 72 captured by a lip 74 of inwardly depending lug 35 of bridge member 32. Spring arm 44 is provided with a slot 76 for accommodating lug 35 so that no interference exists therebetween when the shutter 28 is in its disk-covering position (FIG. 6). Also, lip 74 and the inner surface of front peripheral wall 22 cooperate to guide spring end portion 72 into its seated position on lip 74 when spring 66 is inserted into the cartridge compartment and released. To assemble spring 67 to the shutter and cartridge, spring end portions 68, 72 are initially bent into the dotted position seen in FIG. 6, and then inserted into the cartridge compartment through aperture 78 until end portions 68, 72 clear front peripheral wall 22. Released end portion 68 automatically nests in slot 70 and released end portion 72 is automatically guided by wall 22 and lug 35 into seated engagement with lip 74.

Figure 8:
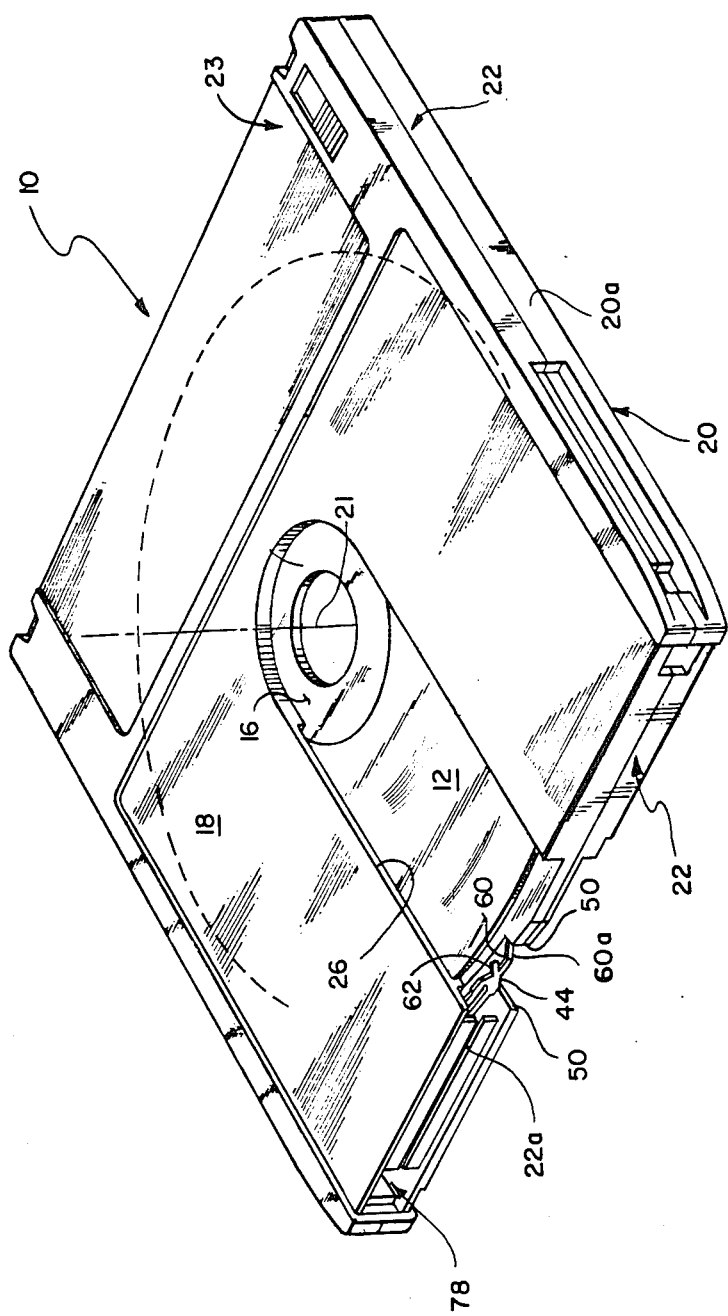
FIG. 8 is a top perspective view of a disk cartridge similar to FIG. 1 illustrating the cartridge with the shutter removed.

FIG. 8 is a top perspective view of the disk cartridge illustrating the cartridge 10 with the shutter 30 removed to more clearly show the grooved track 22a the aperture 78 and the latching portion of the spring arm 44.

The invention has been described in detail with particular reference to a preferred embodiment thereof, but it will be understood that variations and modifications can be effected within the spirit and scope of the invention.

What is claimed is:

1. In a cartridge comprising opposed first and second spaced-apart plates and a peripheral wall, joining said spaced-apart plates, defining an internal compartment in which an information recording disk is rotatably disposed, at least one of said plates having an opening exposing a recording surface of the disk, a generally U-shaped shutter, comprising spaced panels and a bridge member connected therebetween, straddling said cartridge for movement with respect to the aforementioned opening along a forwardly facing portion of said peripheral wall between an open disk-uncovering position and a normally closed disk-covering position, and a return spring arranged for normally automatically biasing said shutter into its disk-covering position when said cartridge is removed from a disk drive mechanism, an improved shutter latch mechanism for said cartridge comprising:

(a) said forwardly facing portion of said peripheral wall having a gap communicating with said internal compartment;

(b) said bridge member of said shutter having a recessed portion including an aperture extending therethrough and a shoulder inclined with respect to said forwardly facing portion of said peripheral wall; and (c) a latch comprising an elongate flat spring arm having a first end portion secured in said compartment to at least one of said spaced-apart plates and an opposite finger-like free end portion forming an inverted V-shaped projection biased by said spring arm to normally extend through the gap of said forwardly facing peripheral wall;

(d) said spring arm and said shutter being arranged with respect to each other so that (1) when said cartridge is removed from a drive mechanism, whereby said shutter is in its disk-covering position under the influence of said return spring, said V-shaped projection is exposed through the aperture of said bridge member and said finger-like end portion abuttingly engages said shoulder of said bridge member for releasably latching said shutter in its closed position, and (2) when said cartridge is loaded into a disk drive mechanism a component thereof is received in said recessed portion of said bridge member, such component (i) during initial cartridge-loading movement biasing said V-shaped projection, against the influence of said spring arm, away from the aperture of said recessed portion to disengage said finger-like end portion from said shoulder of said bridge member and thereby releasably unlatch said shutter, then (ii) during final cartridge-loading movement engaging said shoulder of said bridge member to move said shutter from its closed disk-covering position to its open disk-uncovering position, against the influence of said return spring.

2. A cartridge according to claim 1 wherein said first end portion of said flat spring arm has laterally extending flaps nestable in opposed notches in said spaced-apart plates, said plates further having mating spaced apart abutments for receiving and clamping said first end portion, and said opposite free end portion of said spring arm has a pair of fingers, one on each side of said inverted V-shaped projection extending across said V-shaped projection in the same direction as said free end portion to engage a complementary portion of said inclined shoulder when said V-shaped projection is exposed through the aperture of said bridge member.

3. A cartridge according to claim 1 wherein said flat spring arm has a slot therethrough, and further comprising a lug depending from said bridge member and extending into the slot when said shutter is in its closed disk-covering position, said return spring having one end portion connected to said cartridge and the opposite end portion connected to a lip of said lip for biasing said shutter towards its closed position, said lug and the inner surface of said forwardly facing front peripheral wall cooperating to automatically guide the opposite end portion of said return spring into engagement with said lip when said return spring is inserted into said cartridge and released.

* * * * *